US011764863B2

(12) United States Patent
Scott et al.

(10) Patent No.: US 11,764,863 B2
(45) Date of Patent: Sep. 19, 2023

(54) INCREASED FEEDER LINK CAPACITY FOR GEOSYNCHRONOUS SATELLITE COMMUNICATIONS

(71) Applicants: Michael Scott, Germantown, MD (US); Jack Lundstedt, Germantown, MD (US); Robert Kepley, Germantown, MD (US)

(72) Inventors: Michael Scott, Germantown, MD (US); Jack Lundstedt, Germantown, MD (US); Robert Kepley, Germantown, MD (US)

(73) Assignee: Hughes Network Systems, Germantown, MD (US)

( * ) Notice: Subject to any disclaimer, the term of this patent is extended or adjusted under 35 U.S.C. 154(b) by 81 days.

(21) Appl. No.: 17/562,559

(22) Filed: Dec. 27, 2021

(65) Prior Publication Data

US 2023/0072900 A1 Mar. 9, 2023

Related U.S. Application Data

(60) Provisional application No. 63/242,450, filed on Sep. 9, 2021.

(51) Int. Cl.
*H04B 7/185* (2006.01)
*H04B 7/19* (2006.01)

(52) U.S. Cl.
CPC ........... *H04B 7/18513* (2013.01); *H04B 7/19* (2013.01)

(58) Field of Classification Search
CPC ...... H04B 7/18513; H04B 7/19; H04B 7/185; H04B 10/118; H04B 7/155; H04B 7/18528
See application file for complete search history.

(56) References Cited

U.S. PATENT DOCUMENTS

2018/0069629 A1* 3/2018 Turgeon ................ H04B 10/90

OTHER PUBLICATIONS

Delamotte Thomas: "MIMO Feeder Links for Very Hgh Throughput Satellite Systems", Dissertation, Dec. 19, 2019 (Dec. 19, 2019), pp. 1-144, XP055936702, Munich, Germany Retrieved from the Internet: URL:https://athene-forschung.unibw.de/doc/134066/134066.pdf [retrieved on Jun. 29, 2022] sections 1.4, 2.1-2.3, 3.1-3.3, and 6.1.
International search report for PCT Application No. PCT/US2022/076001.
Palacin Baptiste et al: "Multibeam antennas for very high throughput satellites in Europe: Technologies and trends", 2017 11th European Conference on Antennas and Propagation (EUCAP), EURAAP, Mar. 19, 2017 (Mar. 19, 2017), pp. 2413-2417, XP033097610, DOI: 10.23919/EUCAP.2017.7928493 retrieved on May 15, 2017] sections I-IV; figure 9.

* cited by examiner

*Primary Examiner* — Keith Ferguson
(74) *Attorney, Agent, or Firm* — Capitol City TechLaw; Jasbir Singh

(57) ABSTRACT

A system to reduce a count of satellite gateways is disclosed. The system includes: a feeder link capacity of a satellite; a spectrum ranging from 26.5 GHz to 75 GHz; a gateway feeder link capacity that is an aggregate of capacities of channels defined in the spectrum; and RF gateways communicating with the satellite via the channels, wherein the count of the satellite gateways is less than or equal to a rounded-up integer of the feeder link capacity divided by the gateway feeder link capacity, and the satellite is a geosynchronous orbit satellite.

14 Claims, 1 Drawing Sheet

Figures 1, 2:
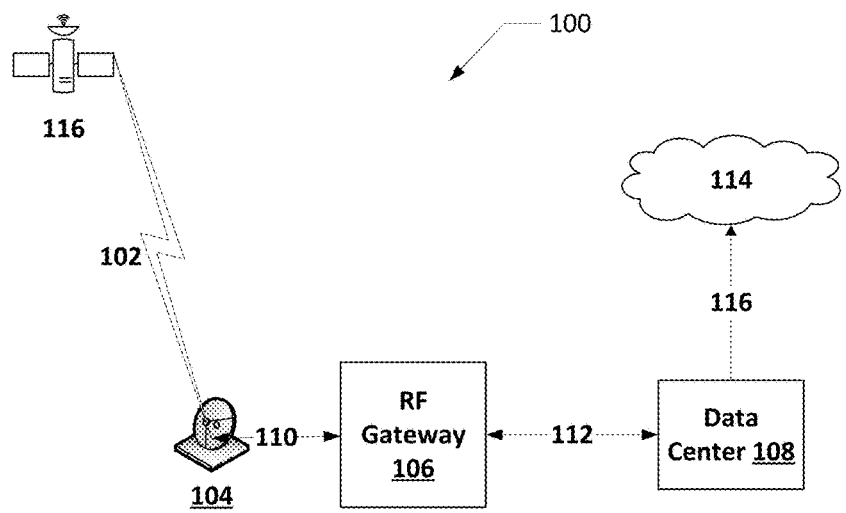

| Direction | Name | F_LO (GHz) | F_HI (GHz) | BW_CH (GHz) |
|---|---|---|---|---|
| Tx | Ka Low | 27.5 | 28.0 | 2/1 GHz |
| Tx | Ka High | 28.1 | 29.1 | 2 GHz |
| Tx | V Low | 47.2 | 48.2 | 2 GHz |
| Tx | V Mid-Low | 48.2 | 49.2 | 2 GHz |
| Tx | V Mid-High | 49.2 | 50.2 | 2 GHz |
| Tx | V High | 50.4 | 51.4 | 2 GHz |
| Rx | Q Low | 40.0 | 41.0 | 2 GHz |
| Rx | Q High | 41.0 | 42.0 | 2 GHz |

INCREASED FEEDER LINK CAPACITY FOR GEOSYNCHRONOUS SATELLITE COMMUNICATIONS

CROSS-REFERENCE TO RELATED APPLICATIONS AND INCORPORATION BY REFERENCE

The present application claims the benefit under 35 U.S.C. 119(e) of U.S. Provisional Application Ser. No. 63/242,450, filed Sep. 9, 2021, which is incorporated herein by reference in its entirety.

FIELD

A feeder link capacity of a High Throughput Satellite (HTS) cannot be exhausted with a conventional number of gateways. A single satellite may be used to minimally increase a cost of the satellite system by the use of higher frequency feeder link spectrum to communicate with the satellite. For a given geographic area, a decreased number of gateways with acceptable interference levels among them can be used to exhaust the feeder link capacity of a HTS.

BACKGROUND

Each generation of Geosynchronous High Thruput Satellites (HTSs) has realized a significant increase in capacity/beam count. Satellite feeder link capacity has more than tripled between generations. Using Ka-band alone to exhaust the satellite capacity would require more than 60 gateway sites. Such a large number of gateways for a satellite is expensive in time, labor and management. Higher frequency feeder link spectrum has not been used to communicate with the Geosynchronous satellite. The V/Q-band spectrum has not been used for communications between a Geosynchronous satellite and a satellite gateway.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose using the V/Q band (50/40 GHz), singly or in combination, with the Ka-band to keep a gateway count for HTS to be less than 20, for example, 18. The multibeam satellite system communicates with multiple gateways in the same time-frequency to provide spatially multiplexed signals for uplink and downlink channels on a feeder link side.

A system to reduce a count of satellite gateways is disclosed. The system includes: a feeder link capacity of a satellite; a spectrum ranging from 26.5 GHz to 75 GHz; a gateway feeder link capacity that is an aggregate of capacities of channels defined in the spectrum; and RF gateways communicating with the satellite via the channels, wherein the count of the satellite gateways is less than or equal to a rounded-up integer of the feeder link capacity divided by the gateway feeder link capacity, and the satellite is a geosynchronous orbit satellite.

The system where the feeder link capacity of the satellite is greater than 80 GHZ, and the gateway feeder link capacity is greater than or equal to 10 GHz.

The system where the feeder link capacity of the satellite is greater than 80 GHZ, and the count of the satellite gateways is less than 20.

The system where the feeder link capacity of the satellite is greater than 150 GHZ, and the gateway feeder link capacity is greater than or equal to 11 GHz.

The system where the spectrum ranges from 40 GHz to 75 GHz.

The system where the spectrum ranges from 26.5 GHz to 52 GHz.

The system where the spectrum is non-contiguous.

The system where the spectrum ranges from 26.5 GHz to 29.5 GHZ and 47 GHz to 52 GHz.

The system where one of the channels is defined by a non-contiguous frequency band.

The system where some of the capacities of the channels are different than capacities of other channels.

The system including a forward error encoder to encode a respective data stream assigned to one of the channels.

The system including a pre-transmission interference processor of a Tx signal on one of the channels, wherein the spectrum is divided into portions and a compensation by the pre-transmission interference processor is based on portions of the spectrum being transmitted by the Tx signal.

The system where the feeder link capacity of the satellite is greater than 150 GHZ, the gateway feeder link capacity is greater than or equal to 11 GHz, the count of the satellite gateways is less than 20, and the spectrum ranges from 26.5 GHz to 29.5 GHZ and 47 GHz to 52 GHz.

The system including a post-transmission interference processor to recover an Rx signal on one of the channels.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 1 illustrates a satellite feeder link system in one embodiment.

FIG. 2 lists an exemplary spectrum used by an RF gateway of according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings disclose a multibeam satellite system that can achieve orthogonality between spatially multiplexed signals when operating in line-of-sight (LOS) channels, using satellite links utilizing a large frequency spectrum. By utilizing a larger frequency spectrum, a capacity/bandwidth of satellite links from a gateway to a satellite and satellite to the gateway can be increased.

The satellite link may operate in a Ka band, Q band, or V band. In an exemplary embodiment, the V and Ka bands may be used on the gateway to satellite feeder link and the Q-band may be used on the satellite to gateway feeder link. The Ka band may be used for feeder links in either direction. The Ka band is a portion of the electromagnetic spectrum defined as frequencies in the range of 26.5-40 gigahertz (GHz). The Q band is a range of frequencies included in the microwave region of the electromagnetic spectrum in a range of 33 to 50 GHz. The V band is a band of frequencies in the microwave portion of the electromagnetic spectrum ranging from 40 to 75 GHz. The frequency spectrum used for the satellite links may be non-contiguous. In some embodiments, a downlink frequency spectrum (satellite to gateway) may be disposed between portions of an uplink frequency spectrum (gateway to satellite).

The present teachings are applicable to a Geosynchronous Earth Orbit (GEO) satellite system, as long as LOS channels, in particular, dominant LOS channels are used. In a dominant LOS channel, a free space signal from the transmitter to the receiver is stronger than a scattered space signal from the transmitter to the receiver. In some embodiments, linear pre-processing at the gateways mitigates interference and spatially separates the multiplexed signals without requiring matrix processing onboard the satellite for an uplink (gateway to satellite). In some embodiments, for the downlink, linear post-processing at the gateways may mitigate interference and spatially separate the multiplexed signals without requiring matrix processing onboard the satellite. The gateway-based linear pre and post processing of a signal in LOS may be used with satellite bent-pipe architectures.

FIG. 1 illustrates a satellite feeder link system in one embodiment.

FIG. 1 illustrates a system 100 (or satellite feeder link system 100) including a satellite link 102 (wireless), an RFT 104 (Radio Frequency Terminal), an RF gateway 106, an Interfacility Link (IFL 110), a fiber link 112 and a data center 108. The data center may be connected to the Internet 114. The RFT 104 may communicate with a satellite 116 via the satellite link 102. When the satellite link 102 communicates from the RFT 104 to the satellite 116, it is referred to as an uplink. When the satellite link 102 communicates from the satellite 116 to the RFT 104, it is referred to as a downlink.

The RFT 104 includes an antenna system and associated RF electronics (typically housed in a hub located near a reflector). This includes electronics to provide a Tx path (frequency conversion from an Intermediate Frequency (IF) to RF and amplification) and Rx path (Low noise RF amplification followed by frequency conversion from RF to IF) as well as other electronics. The RFT 104 includes a reflector, which may collect radio waves from the satellite and convert the collected radio waves to a signal for the Rx path sent through the IFL 110 to the RF gateway 106. This conversion of RF to a lower block of IF, allows the signal to be carried, e.g., via a wired connection such as the IFL 110, to the RF gateway 106. Typically, the RF gateway includes baseband modems, data processing, and a networking interface to data center 108 via the fiber link 112. In some embodiments, the RFT 104 and the RF gateway 106 may be collocated (for example, within an antenna structure), while the data center 108 may be remote, for example, 10, 20, 100 or the like kilometers away.

The RFT 104 typically includes a sender antenna configured to send radio frequency waves to a satellite. The RFT 104 is electrically wired to the RF gateway 106 to receive an outgoing RF signal via the IFL 110 and to send the RF signal via the satellite link 102 to the satellite 116. In the present context, a satellite link is a wireless communication between the RF gateway 106, the RFT 104 and satellite 116. Satellite link 102 is typically established upon configuring a modem modulator, demodulator, encoder, and/or decoder.

The RF gateway 106 may provide pre-interference interference processing for a Tx signal prior to transmitting. The RF gateway 106 may provide post-interference interference processing for a Rx signal upon receipt. The pre and post interference processing may be The data center 108 may be connected to the RF gateway 106 via a fiber link. The data center 108 may provide access to the Internet, bandwidth allocation, network address translation, system management, diversity management and the like for terminals (not shown) connected via a wireless link (not shown) from the satellite to the terminals, and the Internet 114. The data center 108 may be connected to multiple Points of Presence (POPs) to access the Internet 114. The data center 108 may service multiple RF gateways. The data center 108 may serve all or some of the RF gateways of a system 100. The RFGW 106 typically resides in a collocated data center 108. As such, the fiber link 112 would be a cross-connect or short run connection within the data center 108. In some embodiments, the RF gateway 106 may not be collocated with the RF gateway 106 and the fiber link 112 can be significant distance.

Significant gains are made when compared with systems that do not use the Ka, Q and V bands for uplinks or downlinks between a gateway and a satellite.

FIG. 2 lists an exemplary spectrum used by an RF gateway of according to various embodiments. The spectrum uses portions of the Ka, Q and V bands. The spectrum is non-contiguous. Capacity provided by the RF gateway is doubled by using right-hand and left-hand polarizations concurrently. The Rx channels are disposed between the Tx channels.

In this example, RF gateway's Tx feeder link capacity is about 12 GHz, and the RF gateway's Rx feeder link capacity is about 4 GHz. The gateway feeder link capacity is sum of the two, namely, 16 GHz. At least the RF gateway's Tx feeder link capacity is about 3 times greater than typical RF gateway installations. As such, the number of RF gateways needed to exhaust a feeder link capacity of a satellite is reduced by at least a factor of three (3).

In FIG. 2, 1 GHz of the RF gateway's Tx feeder link capacity may be used for system signaling. In such a configuration, the RF gateway's Tx feeder link capacity is about 11 GHz, and the gateway feeder capacity is about 15 GHz. In some embodiments, the gateway feeder link capacity may be greater than or equal to 8 GHz, 10 GHz, 12 GHz, 15 GHz, 25 GHz or the like.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A system to reduce a count of satellite gateways, the system comprising:
   a feeder link capacity of a satellite;
   a spectrum ranging from 26.5 GHz to 75 GHz;
   a gateway feeder link capacity that is an aggregate of capacities of channels defined in the spectrum; and
   RF gateways communicating with the satellite via the channels,
   wherein the count of the satellite gateways is less than or equal to a rounded-up integer of the feeder link capacity divided by the gateway feeder link capacity,
   the satellite is a geosynchronous orbit satellite.

2. The system of claim 1, wherein the feeder link capacity of the satellite is greater than 80 GHZ, and the gateway feeder link capacity is greater than or equal to 10 GHz.

3. The system of claim 1, wherein the feeder link capacity of the satellite is greater than 80 GHZ, and the count of the satellite gateways is less than 20.

4. The system of claim 1, wherein the feeder link capacity of the satellite is greater than 150 GHZ, and the gateway feeder link capacity is greater than or equal to 10 GHz.

5. The system of claim 1, wherein the spectrum ranges from 40 GHz to 75 GHz.

6. The system of claim 1, wherein the spectrum ranges from 26.5 GHz to 52 GHz.

7. The system of claim 1, wherein the spectrum is non-contiguous.

8. The system of claim 1, wherein the spectrum ranges from 26.5 GHz to 29.5 GHZ and 47 GHz to 52 GHz.

9. The system of claim 1, wherein one of the channels is defined by a non-contiguous frequency band.

10. The system of claim 1, wherein some of the capacities of the channels are different than capacities of other channels.

11. The system of claim 1, further comprising a forward error encoder to encode a respective data stream assigned to one of the channels.

12. The system of claim 1, further comprising a pre-transmission interference processor of a Tx signal on one of the channels, wherein the spectrum is divided into portions and a compensation by the pre-transmission interference processor is based on portions of the spectrum being transmitted by the Tx signal.

13. The system of claim 12, wherein the feeder link capacity of the satellite is greater than 150 GHZ, the gateway feeder link capacity is greater than or equal to 10 GHz, the count of the satellite gateways is less than 20, and the spectrum ranges from 26.5 GHz to 29.5 GHZ and 47 GHz to 52 GHz.

14. The system of claim 1, wherein the satellite comprises a post-transmission interference processor to recover an Rx signal on one of the channels.

* * * * *